INVENTOR.
Raymond C. Hedrick
BY
A. Schapp
ATTORNEY

Jan. 11, 1955 R. C. HEDRICK 2,699,088
PORTABLE PHOTOSTAT MACHINE
Filed Nov. 3, 1950 2 Sheets-Sheet 2
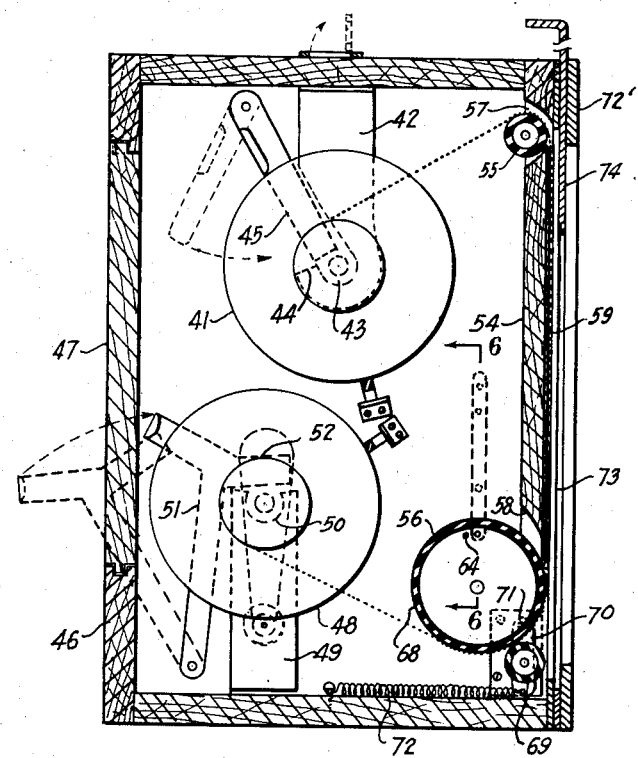
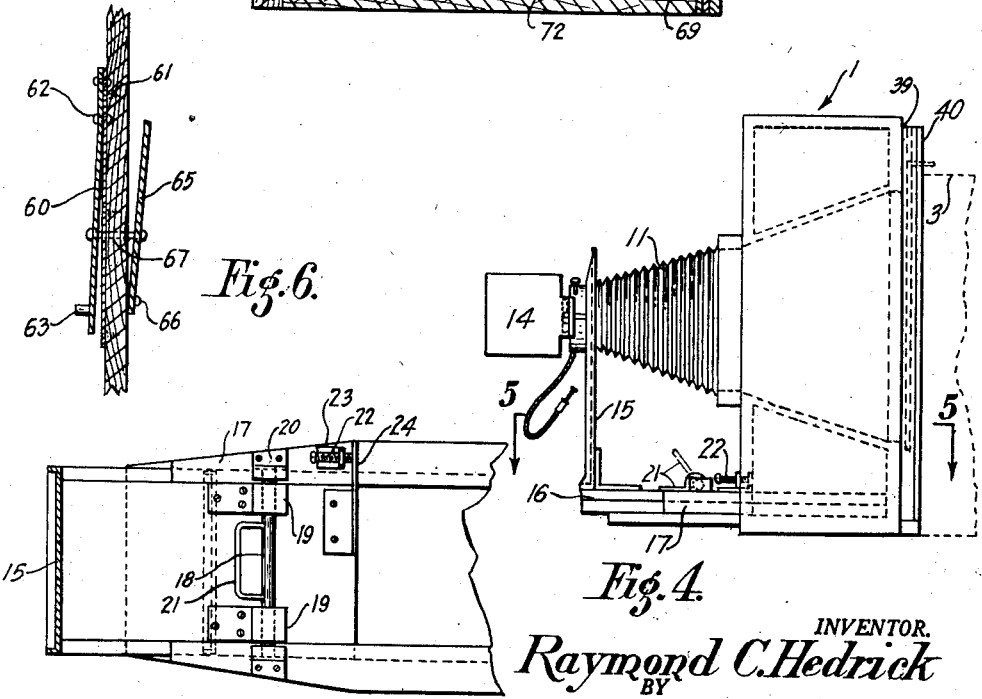
INVENTOR.
Raymond C. Hedrick
BY
A. Schapp.
ATTORNEY

United States Patent Office 2,699,088
Patented Jan. 11, 1955

2,699,088

PORTABLE PHOTOSTAT MACHINE

Raymond C. Hedrick, San Francisco, Calif.

Application November 3, 1950, Serial No. 193,880

1 Claim. (Cl. 88—24)

The present invention relates to a portable photostat machine, and its principal object is to provide a machine of the character set forth in which the camera, the copyholder and a magazine for holding and feeding sensitized paper are arranged with respect to one another to form a portable unit.

More particularly it is proposed to provide a machine of the character indicated in which the copyholder is made in the form of a cover for the front end of the camera and is adapted, in one position, to form a closure for the camera, and in another position, to support copy and illuminating means for the latter in operative relation with respect to the camera for producing images of the copy on sensitized paper carried by the camera or by a magazine attached to the camera.

It is further proposed to use a camera in which the lens and the shutter arrangement are carried by a bellows which, in retracted position, allows the copyholder to fold upon the camera, while, when in advanced position, it brings the lens and the shutter arrangement in proper position with respect to the copyholder for taking pictures of the copy.

It is further proposed to hinge the copyholder with respect to the camera with freedom of swinging movement between open and closed positions and to provide means for locking the copyholder in a position at a right angle to the optical axis of the camera, the latter being equipped with a reflector to deflect light rays emanating from the copy into the camera.

It is additionally proposed in the present invention, to provide means in connection with the portable camera whereby photostats may be taken upon a continuous strip of sensitized paper, the strip being carried in a magazine adapted for securing upon the back of the camera, and means being provided in connection with the magazine for exposing successive sections of the strip.

It is a further object of the invention to provide means whereby measured sections of the strip of sensitized paper may be presented for exposure in successive order and to provide means for marking the end of each section perceptible by feel so as to allow the sections to be separated for use in the dark.

Further objects and advantages of my invention will appear as the specification proceeds, and the novel features of my invention will be fully defined in the claim attached hereto.

Figure 1:
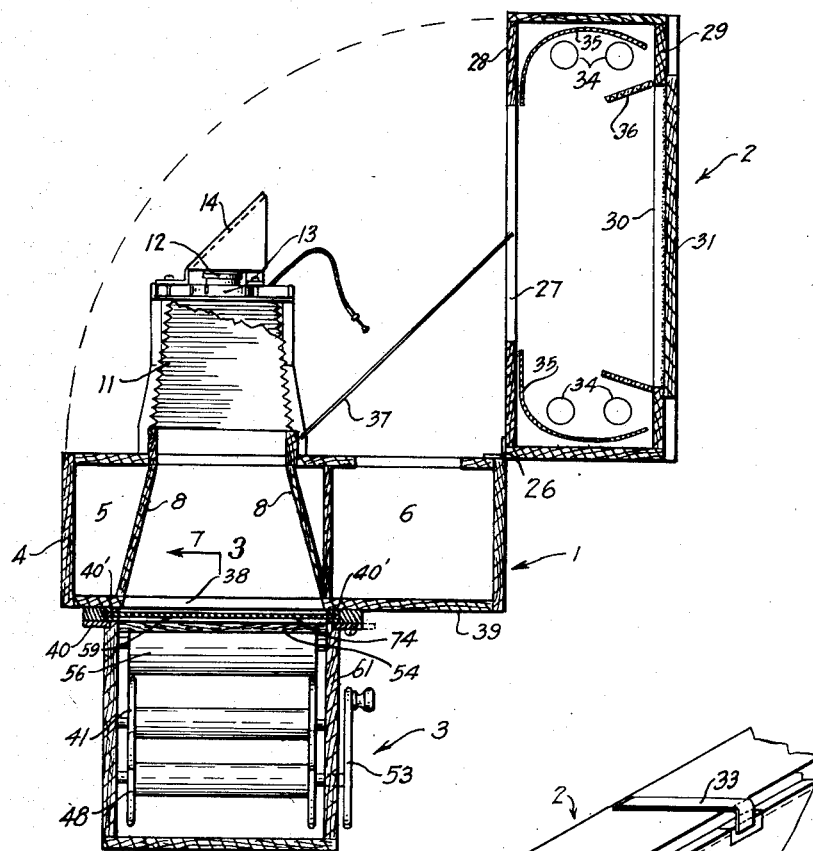
Figure 2:
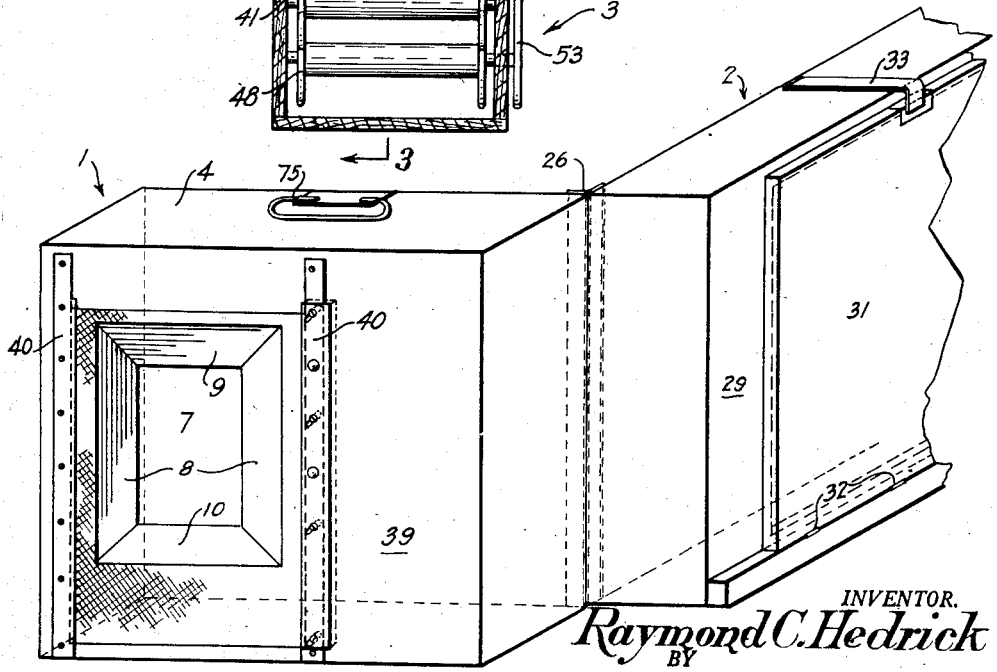

The preferred form of my invention is illustrated in the accompanying drawings, in which Figure 1 shows a horizontal section through my portable photostat machine, with the parts presented in position for taking photostats;

Figure 2, an isometric outside view of the camera and the copyholder in open position;

Figure 3, a vertical longitudinal section through the magazine used in connection with my invention, taken along line 3—3 of Figure 1;

Figure 4, a side view of the camera;

Figure 5, a horizontal section taken along line 5—5 of Figure 4, and

Figure 6, a section taken along line 6—6 of Figure 3.

While I have shown only the preferred form of my invention, I wish to have it understood that various changes and modifications may be made within the scope of the claims attached hereto without departing from the spirit of the invention.

Referring to the drawings in detail, my portable photostat machine consists in its principal features of a camera 1, a copyholder 2 and a magazine 3.

The camera 1 may be, in its general characteristics, of conventional form and comprises, in its principal features, a box 4 divided into two compartments 5 and 6, the former housing the camera and the latter being a storage chamber. Inside the compartment 5 is the light passage 7 defined by slanting side walls 8 and slanting upper and lower walls 9 and 10, the passage expanding in size from front to rear.

Upon the front end of the light passage is mounted a conventional bellows 11 made for expansion and contraction, and carrying, at its front end, a lens at 12, a shutter 13, and a reflector 14, mounted at an angle of 45 degrees with respect to the optical axis of the camera and facing sidewise.

The front end of the bellows is guided by a standard 15 rising from a slide 16 mounted in a guide 17, the slide being adapted for locking in adjusted position by means of a cam shaft 18 revolvable in bearings 19 on the slide and engaging under fingers 20 mounted on the guide. The shaft may be operated by means of a handle 21. The extreme forward movement of the slide is limited by means of a screw 22 threaded into a bracket 23 fixed on the guide and bearing against a stop 24 fixed with respect to the slide.

The copyholder 2 is in the nature of a box of substantially the same dimensions as the camera and hinged to one side edge of the camera as shown at 26. The box is foldable upon the camera and has an opening 27 in its rear wall 28 adapted to allow the projecting portion of the contracted bellows and attendant parts to pass therethrough when the copyholder box is folded upon the camera box. The copyholder box has sufficient depth to accommodate any projecting portion of the camera when the bellows is contracted.

The front wall 29 of the copyholder box has an opening 30 and a panel 31 hinged to the wall of the opening as at 32, this panel being adapted for securing in closed position by means of any suitable fastening means as at 33. The panel serves to receive the copy and is preferably formed with a slightly adhesive surface so as to hold the copy even if arranged in vertical position, but without interfering with the removal of the copy.

For illuminating the copy I provide fluorescent or incandescent light tubes 34 in opposite sides of the box, and reflectors 35 behind the tubes, the reflectors being suitably curved to shed the light over the copy with substantial uniformity. Diffuser plates 36 are mounted between the tubes and the copy to provide a uniform distribution of direct rays emanating from the tubes.

The copyholder is swingable through an angle of 90 degrees and may be held in end position by means of a brace 37.

The rear of the light passage 7 in the camera is open as at 38, and the rear camera wall 39 has guides 40 mounted on opposite sides of the opening 38, one of the guides being adapted for movement into and out-of-the-way position by the inclined slot arrangement shown in Figure 2.

These guides are adapted to receive tongues 40′ projecting from the magazine 3 so as to mount the latter in operative relation with respect to the light passage 7.

The magazine is in the form of a rectangular box and has a sensitized paper spool 41 revolvably mounted in the upper portion thereof. The ends of the spool are mounted in brackets 42 having bearing cavities 43 for said ends, the cavities being open toward the rear as at 44 to allow the spool ends to be introduced into their bearings from the rear. They may be held in position by means of swingable handles 45 adapted to bear on the spool ends and also adapted for swinging into out-of-the-way positions, as shown. The spools may be introduced through the rear wall 46 of the magazine which for this purpose is provided with a removable gate 47.

A receiving spool 48 is similarly mounted in the lower portion of the magazine, in brackets 49, and in open bearings 50 adapted to be closed by handles 51 having spurs 52 extending over the open bearings. This spool has the free end of the sensitized paper attached thereto and may be operated by means of a crank handle 53 for winding the paper from the first spool upon the second one.

In passing from one spool to the other, the paper is guided to pass over the front face of the front wall 54 of the magazine by means of guide rollers 55 and 56. The roller 55 is mounted partly in a slot 57 in the upper portion of the front wall, and the roller 56 is mounted partly in a slot 58 in the lower portion of the front wall, both rollers being flush with the outer face of the front wall. A thin black metal plate 59 may be interposed between the front wall and the passing paper to form a background for the latter.

The roller 56 is used as a measuring roller. Its circumference is equal to the length of individual photostat sections desired on the strip of sensitized paper and the roller is provided with an automatic stop which arrests the rotary movement of the roller at the end of each revolution.

The mechanism for accomplishing this is illustrated in detail in Figure 6, from which it appears that a leaf spring 60 has one end secured upon the inner face of one of the sides 61 of the magazine adjacent the measuring roller, as at 62, its free end being urged toward the end of the roller. The free end carries a prong 63, and the end of the roller is formed with a hole 64 located to pass the prong 63 once during each revolution, so as to allow the prong to enter the hole and to stop the measuring roller, which in turn stops the feed of the sensitized paper.

The stop is released manually by means of a handle 65 mounted upon the outside of the wall, as at 66, the handle being connected to the spring 60 by means of a short rod 67 and being operable to pull the prong 63 out of the hole 64 so as to release the measuring roller for the next revolution.

The measuring roller also has a pin 68 projecting from the circumference thereof, this pin being located to prick the paper passing the roller once for each revolution at a point designating the dividing line between two photostats. Since this pin prick leaves a serrated edge in the paper, it may be readily located by feel in a dark room. It is apparent that a number of alined pins may be used to produce a line of pin pricks at the dividing line and that any other means may be substituted to produce a mark perceptible by touch.

To avoid slipping of the paper on the measuring roll I use a friction roller 69 mounted in a link 70 pivoted as at 71 and bearing on the paper passing over the measuring roll, the friction roller being pressed upon the measuring roll by a spring 72 pulling on the free end of the link.

An open frame 72' is secured upon the front wall 54 of the magazine to furnish a light opening for the exposed strip of paper and tongues 40' engageable in the guides 40 for securing the magazine upon the back of the camera. The frame is grooved in its inner edges as at 73 to receive a slide 74 for closing the light opening.

In operation, the copyholder 2 may be closed upon the front end of the camera 1 when the bellows of the latter is contracted and then forms a unitary structure therewith which resembles an ordinary suitcase, and may be readily carried from place to place by means of a handle 75.

The magazine 3 may be easily secured upon the back of the camera by engaging the tongues 40' on the frame 72' in the guides 40 so that all three parts form a unitary structure.

For using the machine, the copyholder is swung outward as in Figure 1 and secured in right-angular position by the brace 37. The bellows is then drawn out to a predetermined point to establish the proper position for the lens, the copy is placed on the panel 31 of the copyholder and successive photostats may be taken by operation of the crank handle 53, the measuring roller 56 exposing successive lengths of the sensitized paper of equal dimensions, and the pin 68 marking off the dividing lines between the different exposures. The measuring roller stops automatically at the end of each revolution and has to be manually released each time by operation of the handle 65.

It is apparent that the guides 40 may be used to support other forms of holders for sensitized paper.

I claim:

A portable photostat apparatus comprising a rectangular box having a flat bottom and parallel and spaced front and rear walls, a fixed light passage extending through the box from front to rear, an extensible bellows mounted upon the light passage to project forwardly of the box and having a lens and a shutter in the front end thereof and a reflector in front of the lens, and a second rectangular box of the same outline as the first box having a flat bottom and having a side edge hinged to a side edge of the first box and operable for swinging movement to form a closure for the first box in one position and to form an angle with the first box in another position, the front wall of the second box having a panel hinged therein for outward swinging movement to receive copy and to hold the same to face the reflector when swung back to an original position, and the bottom walls of the two boxes being arranged in co-planar relation to cooperate in bracing each other when placed on a plane surface.

References Cited in the file of this patent

UNITED STATES PATENTS

| | | |
|---|---|---|
| 1,572,899 | Mastrukoff | Feb. 16, 1926 |
| 1,600,709 | Bhosys | Sept. 21, 1926 |
| 1,695,382 | McCandless | Dec. 18, 1928 |
| 2,003,691 | Lundberg | June 4, 1935 |
| 2,015,803 | Landrock | Oct. 1, 1935 |
| 2,223,148 | Fullerton | Nov. 26, 1940 |
| 2,227,987 | Tuttle | Jan. 7, 1941 |
| 2,251,335 | Hargreaves | Aug. 5, 1941 |
| 2,487,561 | Landrock | Nov. 8, 1949 |